United States Patent
Riese et al.

[15] 3,672,478
[45] June 27, 1972

[54] HYDRAULICALLY OPERATED WET-TYPE FRICTION CLUTCH

[72] Inventors: Hans-Walter Riese, Dittelbrunn; Gerhard Friedrich, Schweinfurt, both of Germany

[73] Assignee: Fichtel & Sachs AG, Schweinfurt, Germany

[22] Filed: May 11, 1971

[21] Appl. No.: 142,133

[30] Foreign Application Priority Data

May 13, 1970 Germany .................... P 20 23 252.4

[52] U.S. Cl. .......................... 192/86, 192/91 A, 192/113 B, 192/98
[51] Int. Cl. .................................. F16d 25/00, F16d 13/72
[58] Field of Search ............................. 192/113 B, 86, 91 A

[56] References Cited

UNITED STATES PATENTS

| | | | |
|---|---|---|---|
| 2,158,440 | 5/1939 | Spase | 192/113 B |
| 2,969,131 | 1/1961 | Black et al. | 192/86 X |
| 3,474,888 | 10/1969 | Carlson et al. | 192/113 B |

*Primary Examiner*—Benjamin W. Wyche
*Attorney*—Kelman & Berman

[57] ABSTRACT

The release mechanism of a wet-type friction clutch is actuated by a piston which divides the cavity of a cylinder into two compartments. One compartment is connected to an oil pump through a control valve which either admits high-pressure oil to the compartment or vents the compartment to a sump. The other compartment is continuously supplied with oil under lower pressure by the sump pump through a pressure reducing valve, and the oil flows from the other compartment to a nozzle which directs it toward the engageable friction faces of the driving and driven clutch members. When the high-pressure compartment is vented, the oil in the other compartment acts on the piston to retract the clutch release bearing from the release levers or the diaphragm spring of the clutch.

9 Claims, 8 Drawing Figures

HYDRAULICALLY OPERATED WET-TYPE FRICTION CLUTCH

This invention relates to hydraulically operated friction clutches, and particularly to wet-type clutches. Such clutches have their primary field of application in heavy-duty automotive vehicles, and the invention will be described with reference to an automotive clutch without being limited to such use.

It is known from U. S. Pat. No. 3,474,888 to Carlson et al to disengage a wet-type clutch by means of a hydraulic actuator whose elements are returned to their starting position by the clutch spring or springs and an additional return spring when the hydraulic pressure is relaxed and the clutch is engaged.

A primary object of this invention is the provision of a clutch arrangement offering the advantages of the known apparatus, but being simpler and requiring fewer mechanical elements. More specifically, the invention aims at avoiding the return spring of the known device.

In one of its basic aspects, the invention provides a hydraulic actuator whose piston is double-acting, and is moved for clutch release by the pressure of hydraulic fluid, and permanently biased in the opposite direction by the lower pressure of the cooling oil employed for wetting the engagement faces of the driving and driven clutch elements.

In its more specific aspects, the invention provides a conduit system which connects the source of cooling oil to the compartment in the cylinder cavity which is axially bounded by the piston and separated by the piston from the compartment which is supplied with hydraulic fluid at higher pressure when it is desired to disengage the clutch. The conduit system also connects the source of cooling oil to a nozzle directed toward the engageable surfaces of driving and driven clutch members in a manner conventional in wet-type clutches.

Other features, additional objects, and many of the advantages of this invention will readily become apparent as the invention is better understood by reference to the following detailed description of preferred embodiments when considered in connection with the appended drawing in which.

Figure 1:
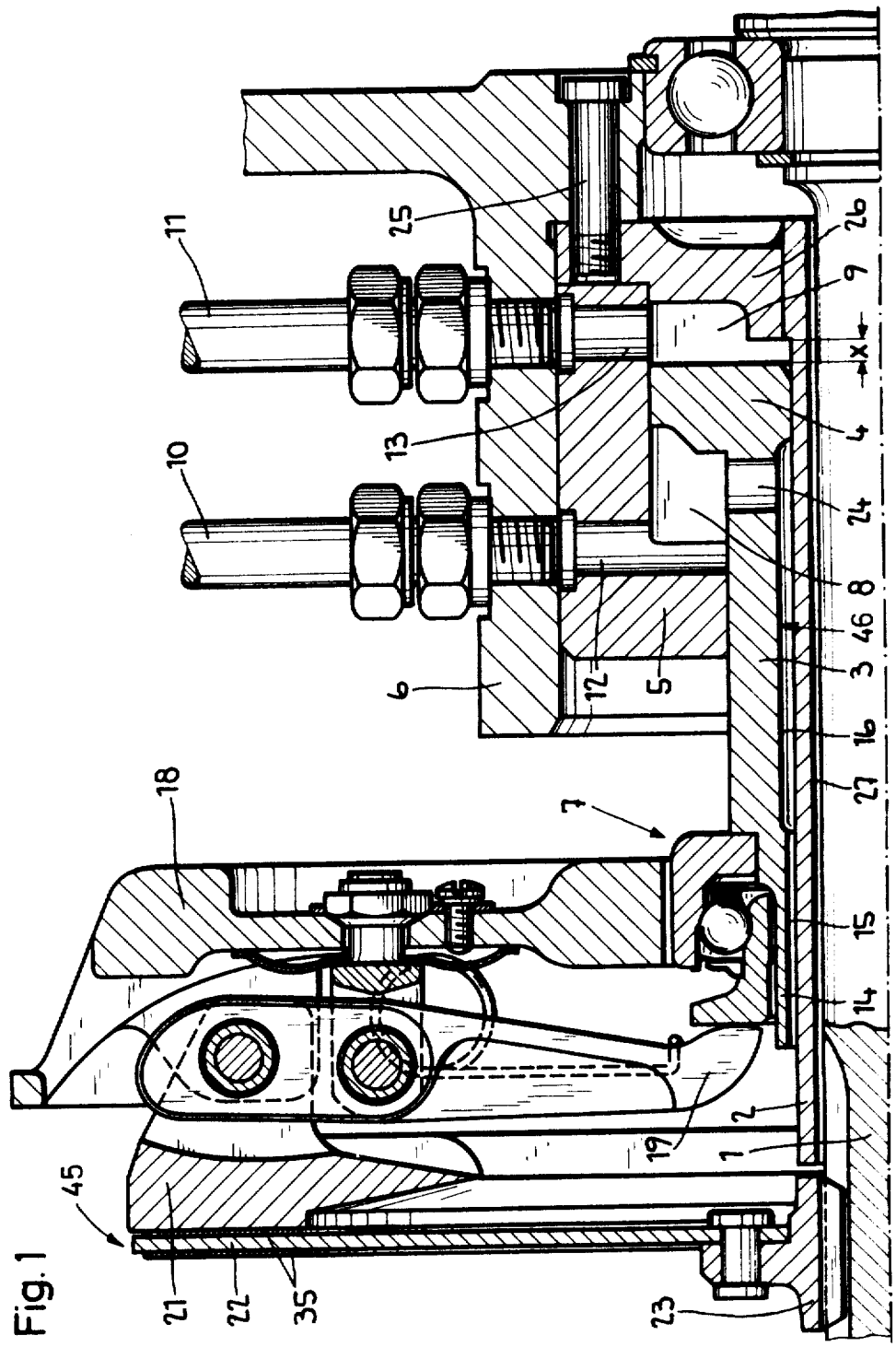
FIG. 1 shows a first clutch arrangement of the invention in fragmentary section on the clutch axis.
Figure 8:
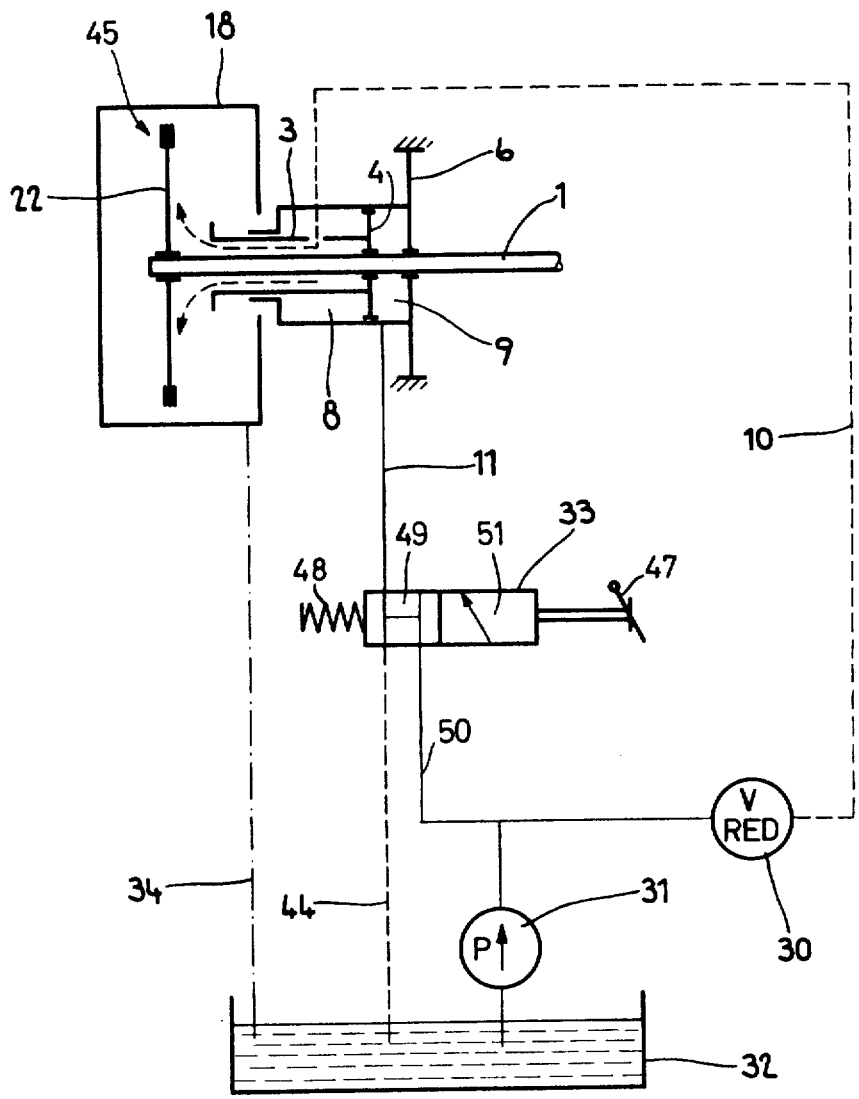

FIG. 8 diagrammatically illustrates the hydraulic circuit of the clutch arrangement of FIG. 1.

Referring now to the drawing in detail, and initially to FIG. 1, there is seen one radial half of a wet-type friction clutch and of associated elements in section on the clutch axis, the non-illustrated half being identical with certain exceptions that will be apparent without further explanation. The clutch is intended for use in an automotive vehicle having a front-mounted internal combustion engine driving the rear wheels, and will be described with reference to such an application.

The clutch arrangement illustrated in FIG. 1 includes a friction clutch 45, conventional in itself, and a hydraulically operated actuating mechanism 46. The clutch shaft 1 is spacedly enveloped over much of its length by a coaxial guide sleeve 2. The latter, in turn, is enveloped by a coaxial, tubular piston rod 3. One axial end of the piston rod is integrally fastened to an annular piston 4 which slides on the outer cylindrical face of the sleeve 2 in the cavity of a coaxial, annular cylinder 5. The cylinder is fixedly attached to a tubular housing 6 which is an integral part of a gear transmission casing, the clutch shaft 1 being the input shaft of the transmission, not otherwise shown, and the guide sleeve 2 being fixedly fastened to the stationary gear transmission casing.

The axial end of the piston rod 3 outside the cylinder 5 and remote from the piston 4 carries a clutch release bearing 7, conventional in itself. The piston 4 divides the cavity of the cylinder 5 into two compartments 8, 9, hereinafter referred to as the low-pressure compartment 8 and the high-pressure compartment 9 for the convenience of description. Lines 10, 11 of flexible tubing communicate with the compartments 8, 9 respectively through ports 12, 13 in the cylinder 5 and aligned openings in the housing 6.

The front end 14 of the piston rod 4 slidably engages the outer face of the sleeve 2 and is formed with axial grooves 15 adjacent the sleeve face. The grooves forwardly vent an annular recess 16 in the inner face of the piston rod 3 toward the interior of a clutch casing 18 on which radial clutch release levers 19 are hingedly mounted in a conventional manner. The radially inner arms of the levers 19 may be engaged and pivoted counterclockwise, as viewed in FIG. 1, by the clutch release bearing 7 when the latter is pushed forward by the piston rod 3.

As is conventional, the levers 19, when so pivoted, lift a pressure plate 21 from a driven clutch disc 22. The disc is normally held in frictional contact between the pressure plate 21 and the non-illustrated flywheel of the associated engine by clutch springs interposed between the casing 18 and the pressure plate, but not explicitly shown. As is also conventional and not illustrated, the casing 18 and pressure plate 21 are secured to the non-illustrated flywheel for joint rotation. Friction facings 35 on the driven clutch disc thus normally engage corresponding friction faces of the flywheel and of the pressure plate which constitute driving clutch members. The hub 23 of the disc 22 is splined to the clutch shaft 1 so that it drives the shaft, but may move axially on the same.

Radial openings 24 in the piston rod 3, of which only one is seen in FIG. 1, connect the low-pressure compartment 8 of the cylinder 5 with the recess 16 in all operative positions of the piston 4. The cylinder 5 is fixedly secured to the housing 6 by screws 25 which also hold a cover 26 on the cylinder, the cover closing the cylinder in a rearward axial direction and being welded to the sleeve 2, thereby holding the sleeve 2 in a fixed position in which it defines an annular gap 27 with the clutch shaft 1.

The apparatus illustrated in FIG. 1 is operated as follows:

An oil pump 31, seen in FIG. 8, but not shown in FIG. 1, supplies cooling oil at low pressure through a pressure reducing valve 30, the line 10, and the port 12 to the low-pressure compartment 8. The pump is directly coupled to the non-illustrated internal-combustion engine which drives the casing 18 and associated clutch elements, and thus supplies cooling oil at relatively low pressure as long as the engine operates.

The oil passes through the radial openings 24 into the recess 16 and is discharged through the grooves 15 in a forward direction. Since the outer orifices of the grooves 15, which constitute discharge nozzles for the cooling oil, are radially aligned with the casing 18, the oil reaches the friction facings 35 and the associated, not fully illustrated cooperating faces of the flywheel and of the pressure plate 21 partly by gravity and partly by centrifugal forces acting on oil projected from the grooves 15 against the driven clutch disc 22. It is returned to the sump 32 of the pump 31 from the casing 18 through a return line 34 as is conventional in wet-type clutches.

A clutch pedal 47 operates a control valve 33 against the biasing force of a return spring 48. The spring 48 normally holds the valve 33 in the illustrated position in which the line 11 and the high-pressure compartment 9 are connected by a return line 44 and a valve section 49 to the sump 32. The connection between the discharge line 50 of the pump 31 and the line 11 is blocked by the valve section 49 which returns excess oil from the line 50 to the sump 32 through the line 44.

When the clutch pedal is depressed, a valve section 51 directs the high-pressure oil from the discharge line 50 into the line 11 and to the high-pressure compartment 9. The high-pressure oil drives the piston 4, piston rod 3, and clutch release bearing 7 toward the left, as viewed in FIG. 1, as far as the clutch release levers 19 can be pivoted, and the clutch is disengaged. The low, permanent pressure of the cooling oil in the compartment 8 cannot effectively impede actuation of the clutch release bearing 7 by the piston rod 3.

When the clutch pedal 47 is released by the driver, the hydraulic fluid is discharged from the high-pressure compartment 9 to the sump 32 initially by the action of the non-illustrated clutch springs on the levers 19 and the clutch release bearing 7 which pushes the piston rod 3 inward of the cylinder 5. When the levers 19 reach the end of their angular stroke by abutment against elements of the casing 18, the position shown in FIG. 1 is reached in which the levers 19 still engage the bearing 7, and the piston 4 is spaced a distance x from the cover 26. The cooling oil in the compartment 8 being no longer opposed by significant oil pressure in the compartment 9 further moves the piston 4 inward of the compartment 9 until the piston abuts against the cover 26, and the clutch release bearing 7 is axially spaced from the levers 19. The rotating part of the bearing 7 comes to rest and is not subjected to wear as long as the clutch remains engaged. No return spring is needed for supplementing the action of the clutch springs in restoring the starting position of the actuating mechanism for the release bearing 7 mainly constituted by the cylinder 5, the piston 4, and the piston rod 3.

Since the same oil is being used for cooling the frictionally engaged surfaces of the clutch 45 and for driving the clutch release actuator, some leakage between the high-pressure and low-pressure compartments 9, 8 can be tolerated, and no complex seals are needed on the cylinder 4. The small amounts of oil leaking past the piston provide good lubrication at the interfaces of the piston with the cylinder 5 and the guide sleeve 2. No other lubrication of the clutch release actuating mechanism is needed.

Figure 2:
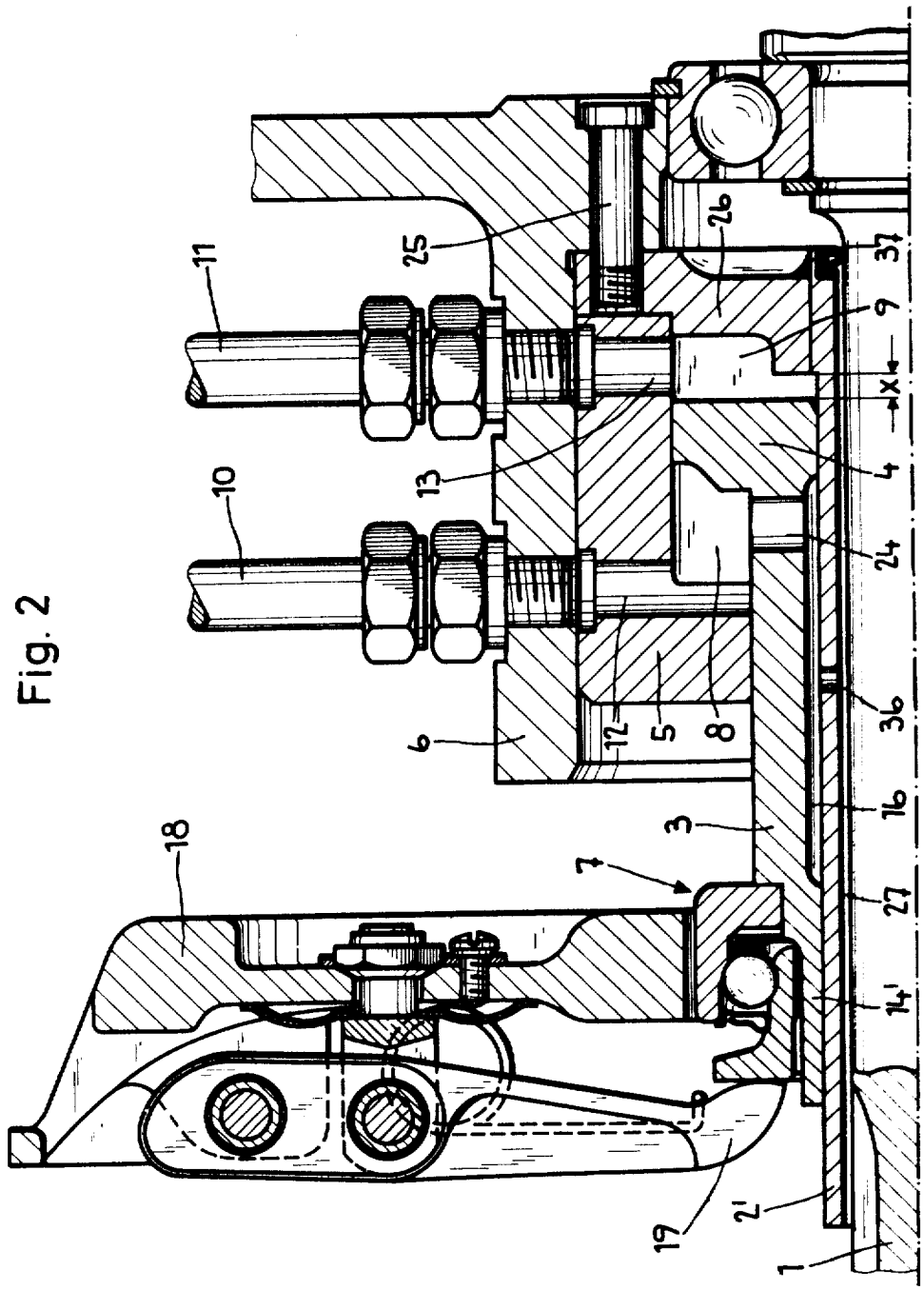
FIGS. 2 and 3 illustrate modifications of the arrangement of FIG. 1 in corresponding views.

The clutch arrangement shown in FIG. 2 is practically identical with that described with reference to FIG. 1 except for details of the conduit and discharge nozzle through which cooling oil from the low-pressure compartment reaches the frictionally engaged faces of the driving and driven clutch elements omitted from FIG. 2. The elements common to the devices of FIGS. 1 and 2 have been provided with the same reference numerals and will not be described again.

The cooling oil which reaches the groove 16 through the line 10, the compartment 8, and the radial opening 24 in the piston rod 3 is confined axially in the groove 16 by the modified front part 14' of the piston rod 3 which sealingly engages the guide sleeve 2' and is free from axial grooves in its inner face. The oil flows from the recess 16 through radial passages 36 in the sleeve 2' into the annular gap 27 between the clutch shaft 1 and the sleeve 2', the open, annular front end of the gap 27 providing a discharge nozzle axially close to the non-illustrated engageable clutch elements. Rearward flow of the oil from the gap 27 is prevented by an annular seal 37 mounted on the rear end of the sleeve 2' and engaging the shaft 1.

Except for the discharge of the cooling oil from the nozzle provided by the annular front orifice of the gap 27, the apparatus shown in FIG. 2 operates in the same manner as that described with reference to FIG. 1.

Figure 3:
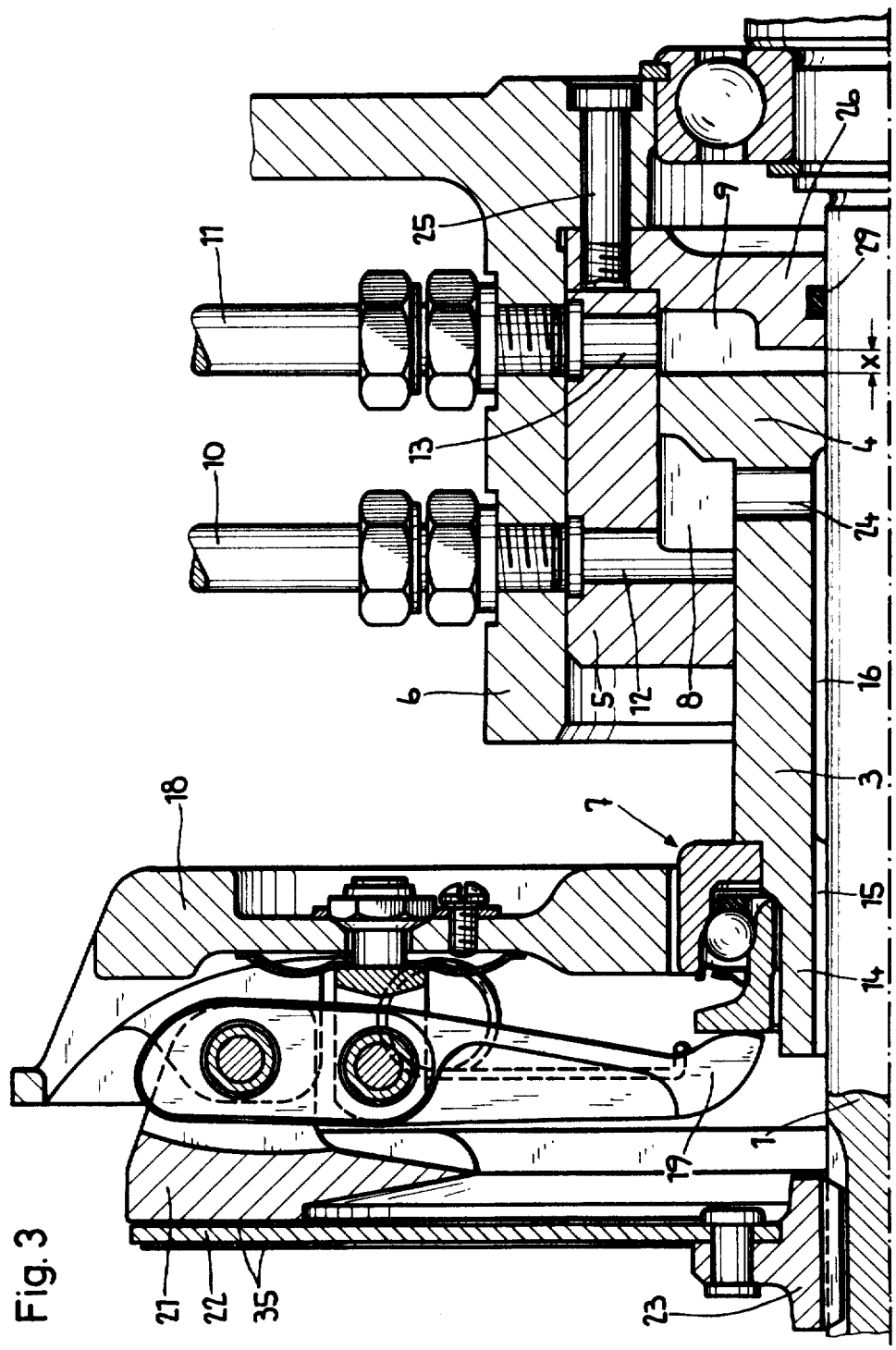

The modified clutch arrangement shown in FIG. 3 differs from that illustrated in FIG. 1 mainly by the ommission of the guide sleeve 2. The piston 4 and the front end 14 of the piston rod 3 slidably engage the outer cylindrical face of the clutch shaft 1 which bounds the recess 16 in a radially inward direction. Oil is discharged from the recess 16 through nozzles formed by grooves 15 in the front end 14, as described above. The cooling oil is thus fed directly to the cylindrical surface of the shaft 1 and lubricates the shaft in a simple and effective manner. Minor oil leakage between the high-pressure and low-pressure zones is irrelevant. Rearward leakage of oil from the high-pressure compartment 9 along the shaft surface is held to a minimum by a sealing ring 29 partly recessed in the cylinder cover 26.

Figure 4:
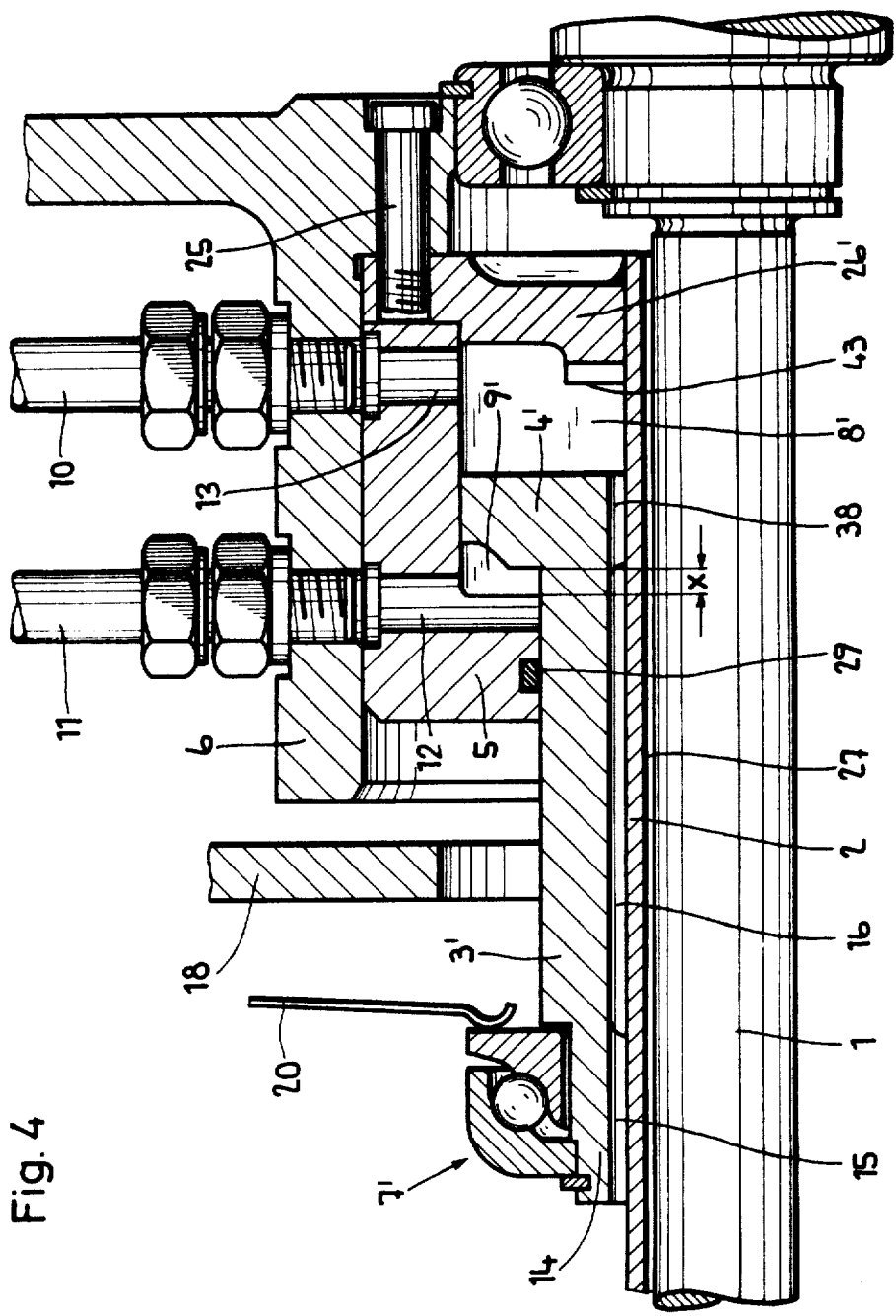
FIG. 4 shows a second clutch arrangement of the invention in fragmentary section on the clutch axis.

While the clutches shown in FIGS. 1 to 3 are released by movement of the piston rod 3 outward of the cylinder 5 to push the release bearing 7 against the clutch release levers 19, the opposite piston rod movement is required in the clutch arrangements partly illustrated in FIGS. 4 to 7 in which the driving and driven clutch elements are normally held engaged by a radially slotted diaphragm spring, only one radial tongue 20 of the spring being shown in FIG. 4, the clutch being entirely conventional as far as not explicitly shown and described.

The clutch release actuator mechanism of FIG. 4 includes a cylinder 5, not significantly different from the corresponding elements described above. The piston 4' and the front end 14 of the piston rod 3' slide on a guide sleeve 2, and grooves 15 in the inner face of the front end 14 provide discharge nozzles for cooling oil. They communicate with an annular recess 16 in the piston rod 3', and the latter receives oil from a low-pressure compartment 8' located in the cylinder 5 behind the piston 4' through axial grooves 38 in the inner piston face. Grooves in a radial abutment face 43 of the cylinder cover 26' connect the port 13 and the cooling oil line 10 to the grooves 38 even when the piston 4' abuts against the face 43.

Escape of oil under high pressure from the compartment 9' ahead of the piston 4' is prevented by a sealing ring 29 recessed in the cylinder 5 and engaging the outer surface of the piston rod 3'.

The front end 14 of the piston rod 3' carries a release bearing 7' which is pulled backward toward the cylinder 5 when high-pressure oil is admitted to the compartment 9' as described above. The tongues 20 of the partly illustrated diaphragm spring are thereby pivoted to disengage the clutch, and the resilient force of the spring returns the actuator mechanism to the position shown in FIG. 4 when the high-pressure compartment 9' is vented to the sump 32 in a manner obvious from FIG. 8. Further movement of the piston rod 3' outward of the cylinder 5 over the distance x is caused by the permanent, low pressure of the cooling oil in the compartment 8' whereby the release bearing is offset forwardly from the tongues 20.

Figure 5:
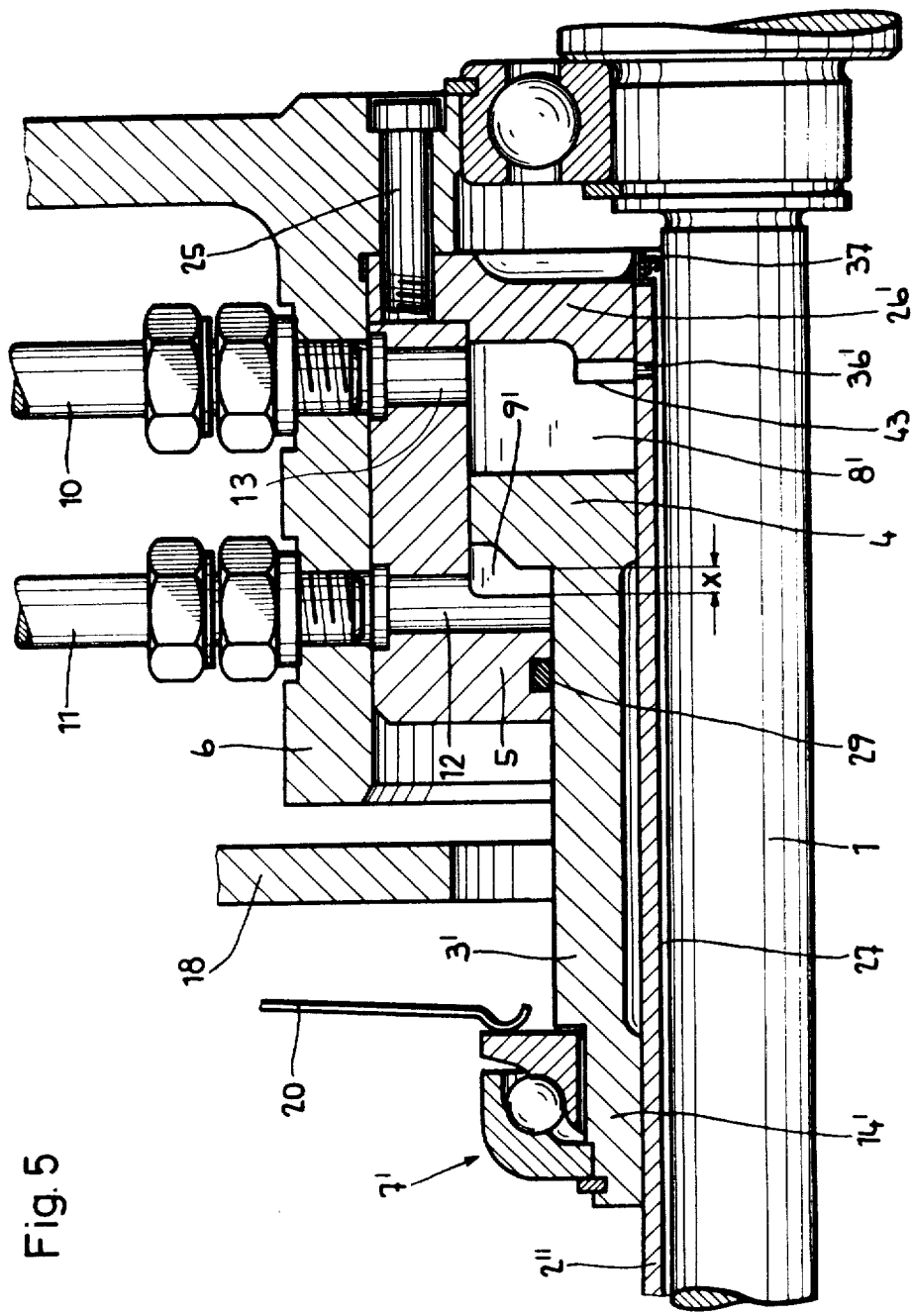
FIGS. 5 to 7 illustrate modifications of the arrangement of FIG. 4.

The clutch arrangement of FIG. 5 is provided with a discharge nozzle for the cooling oil analogous to that described above with reference to FIG. 2, but is otherwise closely similar to the device of FIG. 4. It differs from the latter by a piston 4 and front end 14' of the piston rod which are free from axial grooves in their inner faces. Oil passes from the low-pressure compartment 8' to the gap 27 between the sleeve 2'' and the shaft 1 through openings 36' in the sleeve aligned with the radial grooves in the abutment face 43, and is discharged from the open annular front end of the gap 27. The rear end of the gap 27 is closed by an annular seal 37.

Figure 6:
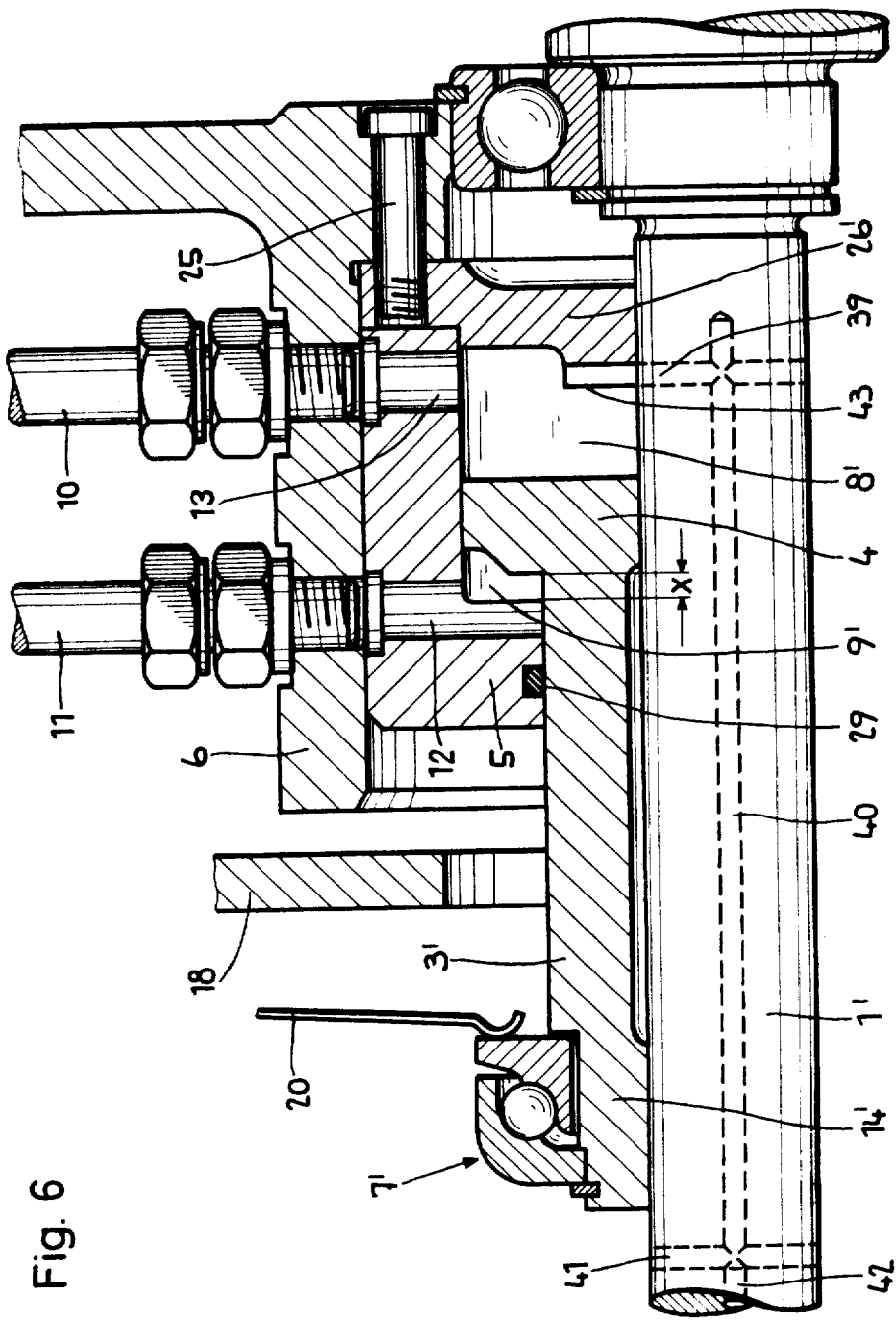

FIG. 6 shows a further modification of the clutch arrangement of FIG. 4 in which a guide sleeve is omitted and the piston 4 and the front end 14' of the piston rod 3' slide on the outer face of the clutch shaft 1'. Cooling oil enters a central, axial bore 40 in the shaft through radial bores 39 aligned with the grooves in the abutment face 43, and is discharged through radial bores 41 approximately aligned with the friction facings 35 in a radial direction, the clutch disc 22 and its facings not being seen in FIG. 6. The front end of the bore 40 is closed by a plug 42.

Figure 7:
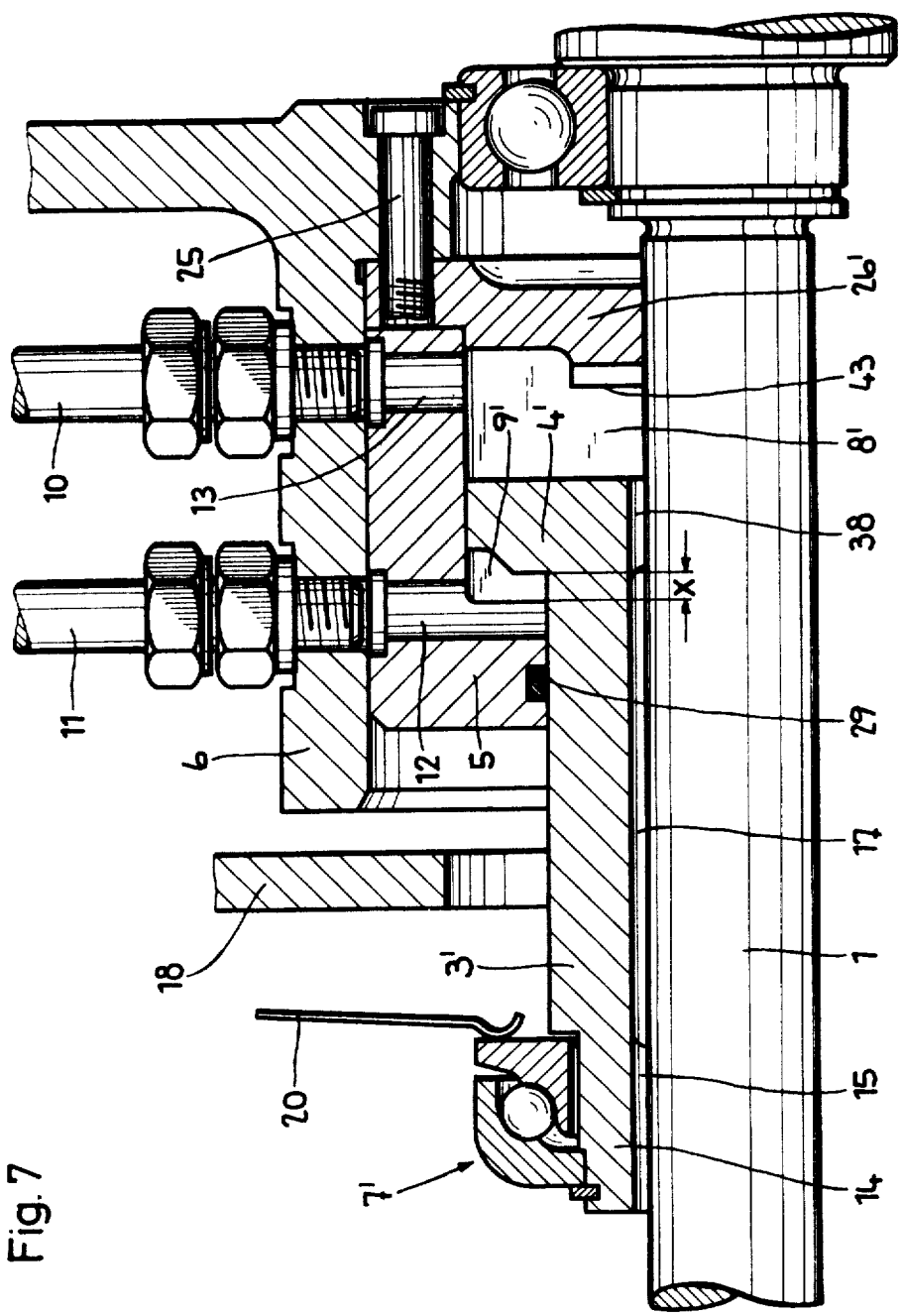

The clutch arrangement shown in FIG. 7 combines direct sliding engagement of the piston 4' and of the front end 14 of the piston rod 13 with the clutch shaft, in the manner of FIG. 6, with oil discharge from the compartment 8' through axial grooves 38 in the piston, a recess 16 in the piston rod 3', and axial grooves 15 in the front end 14.

In the clutch release actuating devices shown in FIGS. 4 to 7, the port 12 of the cylinder 5 connects the high-pressure line 11 to the high-pressure compartment 9', and the low-pressure line 10 is connected by the port 13 to the low-pressure compartment 8'. The devices cooperate with a hydraulic circuit similar to that shown in FIG. 8 in an obvious manner.

It should be understood, of course, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:

1. In a hydraulically operated, wet-type friction clutch arrangement including a driving clutch member, a driven clutch member, said members being mounted for rotation about a common axis and having respective friction faces, clutch spring means biasing said members toward torque-transmitting engagement of said faces, clutch release means for disengaging said faces against the biasing force of said spring means, hydraulically operated actuating means for actuating said clutch release means, said actuating means including a source of hydraulic fluid under pressure, a cylinder member having an axis and defining a cavity therein, a piston member axially movable in said cavity and dividing the same into two compartments, connecting means connecting said piston member to said clutch release means for disengaging said faces when said piston member moves in said cavity in one axial direction, said faces being engaged by said clutch spring means when said piston member moves in the other axial direction, and flow control means interposed between one of said compartments and said source of hydraulic fluid and alternatively operative for admitting said fluid to said one compartment and for thereby moving said piston member in said one direction, and for releasing the admitted fluid from said one compartment, a source of cooling oil under a pressure lower than the pressure of said fluid, and nozzle means communicating with said source of cooling oil for discharging said oil toward said faces, the improvement which comprises:

conduit means connecting said source of cooling oil to the other compartment in said cavity and to said nozzle means, whereby said cooling oil tends to move said piston member in said other axial direction.

2. In an arrangement as set forth in claim 1, said conduit means including a first conduit connecting said source of cooling oil to the other compartment in said cavity and a second conduit connecting said other compartment to said nozzle means for passage of said cooling oil from said source thereof through said other compartment toward said nozzle means.

3. In an arrangement as set forth in claim 2, said first and second conduits constituting the only connection between said source of cooling oil and said nozzle means, said connection being permanently open.

4. In an arrangement as set forth in claim 1, wherein a clutch shaft is coaxially secured to said driven clutch member for joint rotation, said piston member and said cylinder member being tubular and coaxially enveloping said clutch shaft.

5. In an arrangement as set forth in claim 4, said sources including a common sump and a common oil pump communicating with said sump for drawing liquid from the same, said liquid constituting both said hydraulic fluid and said cooling oil.

6. In an arrangement as set forth in claim 5, a pressure reducing valve in said conduit means for reducing the pressure of said cooling oil to said lower pressure.

7. In an arrangement as set forth in claim 6, said flow control means including a control valve communicating with said one compartment, said pump, and said sump.

8. In an arrangement as set forth in claim 4, said conduit means including a first conduit connecting said source of cooling oil to said other compartment in said cavity, and a second conduit connecting said other compartment to said nozzle means for passage of said cooling oil from said source thereof through said compartment toward said nozzle means, a part of said second conduit being elongated axially between said piston member said clutch shaft, an axially terminal portion of said second conduit constituting a portion of said nozzle means.

9. In an arrangement as set forth in claim 4, said conduit means including a first conduit connecting said source of cooling oil to said other compartment in said cavity, and a second conduit connecting said other compartment to said nozzle means for passage of said cooling oil from said source thereof through said compartment toward said nozzle means, a part of said second conduit being constituted by an axial bore in said clutch shaft, and said nozzle means including a radial bore in said clutch shaft communicating with said axial bore.

* * * * *